United States Patent [19]

Ehrler

[11] Patent Number: 4,708,721
[45] Date of Patent: Nov. 24, 1987

[54] SOLVENT ABSORPTION AND RECOVERY SYSTEM

[75] Inventor: Arthur J. Ehrler, Brooklyn, Ohio

[73] Assignee: General Signal Corporation, Stamford, Conn.

[21] Appl. No.: 24,850

[22] Filed: Mar. 13, 1987

Related U.S. Application Data

[63] Continuation of Ser. No. 677,233, Dec. 3, 1984, abandoned.

[51] Int. Cl.$^4$ .............................................. B01D 53/14
[52] U.S. Cl. .......................................... 55/40; 55/48; 55/68; 55/89; 55/189; 55/222; 55/229
[58] Field of Search ................. 55/46, 48, 68, 40, 222, 55/228, 242, 189, 89, 85

[56] References Cited

U.S. PATENT DOCUMENTS

| | | | |
|---|---|---|---|
| 3,837,143 | 9/1974 | Sutherland et al. | 55/68 X |
| 3,877,893 | 4/1975 | Sweny et al. | 55/48 |
| 4,227,891 | 10/1980 | Maguire et al. | 55/85 |
| 4,288,234 | 9/1981 | Cox | 55/48 |
| 4,460,383 | 7/1984 | Valerius | 55/48 X |
| 4,494,967 | 1/1985 | Barth | 55/85 X |

Primary Examiner—Charles Hart
Attorney, Agent, or Firm—Cooper, Dunham, Griffin & Moran

[57] ABSTRACT

Materials, such as pollutants, solvents and the like, in a fluid stream, such as a gaseous stream or liquid stream, are removed by contacting the fluid stream with a liquid selective solvent or absorbent for the material or pollutant to be removed. In the case where the fluid stream being treated with the liquid selective solvent is a liquid stream, the liquid selective solvent employed is substantially immiscible with respect to the liquid stream being treated. After contact with the fluid stream being treated the liquid selective solvent, now having the material or pollutant to be removed dissolved therein, is removed from and heated, preferably under a reduced pressure relative to the initial contact of the liquid selective solvent with the fluid stream, gaseous or liquid, to release the material or pollutant therefrom, the material or pollutant then being separately recovered. The resulting liquid solvent, now having a reduced pollutant content, is cooled, preferably by indirect heat exchange contact, with the liquid selective solvent removed after contact with the pollutant-containing fluid stream, and is then returned to contact an additional pollutant-containing fluid stream, a pollutant-containing gaseous stream or a pollutant-containing liquid stream.

3 Claims, 2 Drawing Figures

4,708,721

SOLVENT ABSORPTION AND RECOVERY SYSTEM

This is a continuation of application Ser. No. 677,233, filed Dec. 3, 1984 and now abandoned.

BACKGROUND OF THE INVENTION

In many industrial processes there are produced fluid streams, such as liquid or aqueous streams, and gaseous streams which contain materials therein which must be recovered or removed. For example, in degreasing or in paint spraying operations employing a volatile solvent there is usually produced an air or gaseous stream which contains the voltatilized solvent therein and usually the solvent must be removed or recovered before the air or gaseous stream is discharged into the atmosphere. The removal and/or recovery of such volatile solvents may be required by regulatory agencies to protect the environment or for economic reasons, such as the recovery of the solvent so that it can be recycled or again utilized. In many other industries, such as in the semi-conductor industry and in other processing operations, particularly in the petroleum industry, there are produced gaseous and/or liquid streams which contain materials, which must be removed or recovered.

The recovery of materials, e.g. volatile solvents or treating agents from liquid or gaseous streams, as indicated hereinabove, has been accomplished by various techniques, such as by solvent extraction employing a selective solvent for the volatile component to be recovered. Another technique for the recovery of such volatile materials employs a particle form selective adsorbent, such as activated charcoal, molecular sieves, activated alumina and the like. Various techniques employed for the recovery of volatile materials from a stream containing the same are disclosed in numerous patents, U.S. Pat. Nos. 4,102,983, 4,227,891, 4,339,248, 4,265,945, 4,441,896, 4,101,297. The disclosures of the above-identified patents are herein incorporated and made part of this disclosure.

For the most part, however, the techniques and processes and equipment which have been previously employed for the recovery of volatile solvents and the like from streams containing the same have not been completely satisfactory, particularly as applied for the recovery of volatile solvents or pollutants from an air stream containing the same in a minor amount, such as an amount in the range about 5–10,000 ppm by weight or volume. In connection with the recovery of valuable solvents and treating agents from such air streams or the recovery of noxious or noisome solvents and/or pollutants from such air streams, it is desirable to recover as much as possible such materials, preferably with a recovery or removal efficiency of at least about 90%, and preferably so that the resulting treated stream contains such a small amount of solvent or pollutant therein that either the economics of the process permits the discharge of the treated stream into the environment and/or the discharge thereof does not disturb the environment.

Accordingly, it is an object of this invention to provide an improved process and apparatus useful for the recovery of materials from liquid, such as aqueous, or gaseous streams, such as air streams, containing the same.

It is another object of this invention to provide a process for the recovery of materials, such as solvents, from fluid streams, liquid or gaseous, containing the same, with substantially minimum energy or heat requirements to carry out or operate the process.

How these and other objects of this invention are achieved will become apparent in the light of the accompanying disclosure and the drawings wherein:

FIG. 1 schematically illustrates one embodiment of the practices of this invention for the recovery of a volatile material or solvent from the gas or air stream containing the same; and wherein FIG. 2 schematically illustrates another embodiment of the practices of this invention employing or involving more steps and/or equipment for optimization of the overall process from the point of view of energy requirements and recovery of the volatile materials to be removed and recovered.

SUMMARY OF THE INVENTION

Pollutants or valuable solvents or chemicals in a fluid stream, such as a gaseous or air stream, or a liquid stream, such as an aqueous stream, are removed by contacting the fluid stream containing the same in an absorption zone or absorber or contactor with a liquid selective solvent for pollutants or materials to be removed. In the instance where the fluid stream being treated is a liquid stream, the liquid selective solvent is substantially immiscible with the liquid stream being treated. More specifically, the liquid selective solvent exhibits little, if any, solubility in the liquid stream being treated and the liquid stream being treated exhibits little, if any, solubility in the liquid selective solvent. Upon contact with the liquid selective solvent, these materials in the fluid stream being treated are absorbed or dissolved therein and the liquid selective solvent, now having these materials or pollutants dissolved therein, is removed. The resulting treated fluid stream can usually then be discharged to the environment since it now has a substantially reduced pollutant content, such as a pollutant content or concentration which permits the treated fluid stream, gaseous or liquid, to be discharged into the environment and/or does not economically justify further recovery of the pollutant or other material therefrom.

The liquid selective solvent now having the pollutant or other materials dissolved therein is removed and heated, followed by or combined with a reduced pressure, to release the pollutant therefrom in a volatilized or gaseous form which is then separately volatilized or gaseous form which is then separately recovered, such as by condensation. The resulting heated liquid selective solvent now, having a substantially reduced pollutant content, is then returned to the absorption zone, after having been cooled, such as by indirect heat exchange with the liquid selective solvent leaving the absorption zone or absorber or contactor where the liquid selective solvent first came into contact with the fluid stream, gaseous or liquid, containing the pollutant or other material to be removed. It is thus seen that the liquid selective solvent is recycled throughout the process, first contacting the fluid stream, gaseous or liquid, in the absorption or contacting zone at a relatively low temperature to pick up pollutant therefrom, the liquid selective solvent then withdrawn and heated to release the pollutant therefrom for collection and/or recovery and the liquid selective solvent then cooled to a lower temperature, such as by indirect heat exchange with the pollutant containing liquid selective solvent leaving the absorption or contacting zone so that the liquid selective solvent is returned or recycled to the absorption or contacting zone to pick up and recover additional pollutant from the fluid stream being treated. The aforesaid operations are carried out continuously or on a substantially continuous basis.

The initial contact between the liquid selective solvent and the fluid stream containing the pollutant or other material to be removed therefrom can be effected in any suitable equipment suitable for liquid-liquid or liquid-gas contact. Suitable such equipment include a packed tower, spray tower, or a liquid-liquid mixer. In the practices of this invention a tray tower is preferred to carry out contact between the liquid selective solvent and a gaseous stream being treated since the use of a tray tower for effecting contact between a gaseous stream and the liquid selective solvent permits the absorption of a higher concentration of the material to be absorbed in the liquid selective solvent and this, in turn, reduces the amount of selective solvent which must be handled or treated which, in turn, reduces the size and cost of the other components employed in the overall process, as well as reducing energy consumption.

The contact between the liquid selective solvent and the fluid stream, gas or liquid, being treated is preferably carried out, not only continuously, although a batch operation is possible depending upon the economics and/or the make-up of the fluid stream being treated, but also countercurrently, i.e. in the absorption or contacting zone the liquid solvent enters at one end thereof and the fluid stream being treated enters the other end thereof with the resulting treated fluid stream existing that end of the the absorption or contacting zone where the liquid selective solvent being removed or discharged from the absorption or contacting zone at that end where the fluid streeam to be treated was introduced.

Although countercurrent contact between the liquid selective, solvent and the gas stream being treated is preferred, co-current or cross-flow contact between the fluid stream to be treated and the liquid selective solvent can also, if desired, be employed. In a co-current contacting operation the fluid stream and the liquid selective solvent enter the absorption or contacting zone at essentially the one or same end thereof and the resulting treated fluid stream and the selective solvent is removed from the other end or same end of the absorption zone. A variation of co-current contacting operation applicable in the practices of this invention would be the introduction of the liquid contaminant-containing stream into a mixing zone, such as a batch mixer, together with the liquid selective solvent, the liquid stream being treated and the liquid selective solvent being immiscible with respect to each other. After vigorous contact, the mixed liquids containing the liquid stream being treated and the liquid selective solvent, would be sent to a settler and the separate liquid phases separated, onee phase being the liquid being treated, now having a reduced contaminant conttent, and the other phase being the liquid selective solvent, now having the contaminant dissolved therein. After separation the liquid phase being treated can be discharged or otherwise utilized and the contaminant-containing liquid selective solvent phase treated in accordance with the practices of this invention for the removal of the contaminant therefrom.

It was indicated hereinabove that cross current contact between the fluid phase to be treated, and the liquid selective solvent can be employed in the practices of this invention. Cross-current contact would be particularly applicable when the fluid phase being treated is a gaseous or air stream. In cross current contact the solvent is usually admitted to the top portion of a packed tower or system which permits the distribution of the liquid selective solvent so as to present a high contact surface area relative to the gaseous stream to be treated. As the liquid selective solvent moves downwardly, such as vertically, within the liquid selective solvent wetted, packed contacting tower or contacting section, the fluid or gaseous stream to be treated is passed perpendicularly or transversely with respect to the flow of the liquid selective solvent. The gaseous phase moves through the packed tower which contains a downwardly moving film of liquid selective solvent and intimate contact takes place between the transversely moving gas phase and the downwardly moving or falling film of liquid selective solvent. The liquid selective solvent is usually recovered at the bottom of the contacting zone and the resulting treated gaseous phase is recovered after having moved transversely through the contacting zone.

In the practices of this invention the selective solvent employed should desirably have a high boiling point and a low vapor pressure, exhibit selectivity and/or high solvent capacity for the material or pollutant in the fluid stream to be removed. Further, the liquid selective solvent should be immiscible with the fluid stream, e.g. an aqueous stream, being treated. More particularly, the selective solvent in the case of gas-liquid contact should have an affinity for the material to be removed from the fluid stream and have, in the instance where the fluid stream is a gaseous stream to be treated, a high Henry Law's constant K for the material to be removed ($c = KP$) where c is the concentration of the gaseous material to be removed in the solvent, K is the Henry Law's constant and P is the vapor pressure of the pollutant material to be removed above the liquid mixture of the selective solvent and the pollutant. Desirably, the selective solvent employed in the practices of this invention should not foam or be substantially non-foaming when aerated, be readily available at a relatively low cost, be thermally stable, exhibit low heat capacity (Cp) and have low or substantially no toxicity.

After the selective solvent has absorbed its capacity of the material or pollutant to be removed from the fluid stream being treated stream under the conditions of operation of the absorption or contacting zone, the resulting pollutant-enriched liquid selective solvent is removed, heated and introduced into a desorption or stripping zone or tower which is desirably maintained under a reduced pressure relative to the pressure maintained within the absorption zone. Upon introduction into the desorption tower or the stripper, the pollutant or material in the selective solvent is flashed or released or discharged therefrom and is separately recovered, leaving behind the selective solvent now substantially depleted of pollutant. Theoretically, depending upon the pollutant or material to be removed and the effectiveness or selectivity of the selective solvent employed, it is possible under under some circumstances to operate the absorption zone and the desorption zone or stripper isothermally with the desorption zone or stripper, however, being operated at a substantially reduced pressure relative to the pressure maintained or the absorption zone. In this operation energy requirements would be substantially reduced but an isothermal operation with respect to the operation of the absorption and desorption zones, with the desorption zone being operated at a pressure substantially reduced relative to the desorption zone would be practical for only a limited number of applications wherein the affinity of the selective solvent for the material or pollutant to be removed is substantially or strongly pressure-dependent.

Illustrative of those volatile materials or pollutants which are readily handled, removed and recovered from the fluid stream, such as gas or air streams, containing the same when treated in accordance with the practices of this invention, are the ambient temperature relatively high vapor pressure organic materials, such as alcohols, ethers, esters, ketones, aldehydes, hydrocarbons, such as benzene, toluene, and the xylenes, trichloroethylene, ethyl alcohol, methyl alcohol, n-butyl acetate, ethyl acetate, methyl ethyl ketone, methylene chloride, formaldehyde, ethyl ether, methyl ethyl ether, acetaldehyde, acrolein, the various mercaptans, such as methyl mercaptan, ethyl mercaptan, the various amines, such as the methylamines, ethanolamine, the low molecular weight $C_3$–$C_6$ alkanes and cycloalkanes, the butadienes, the cyclopentadienes and the like, the volatile aromatic compounds and hydrocarbon and, indeed, substantially any volatile material which can be preferentially dissolved by direct contact with a liquid selective solvent therefor. Other materials which are removable and recoverable in accordance with the practices of this invention include arsine, phosphine, $H_2S$, $SO_2$ and other volatile inorganic and metallo-organic compounds.

As indicated hereinabove, various selective solvents are usefully employed in the practices of this invention. Desirably, the liquid selective solvent is water immiscible or selected to be immiscible with the liquid phase to be treated, evidences a low vapor pressure at ambient temperatures and at temperatures in the range 200°–500° F. and evidences a high boiling point at atmospheric pressure, such as a boiling point of at least about 500° F., more or less, at atmospheric pressure. Selective solvents which are useful in the practices of this invention include the adipates, succinates, glutarates, various alkyl phthalates, and other esters of di- and mono-basic acids and glycols, the various organic phosphates, including the alkyl and aryl phosphates, particularly those phthalates and organic phosphates or organic phosphorus compounds which are liquid at about ambient temperature in the range 40°–90° F. and which are useful as plasticizers. Additionally, the selective solvents should be thermally stable and, as indicated hereinabove, exhibit low toxicity and desirably low heat capacity, low cost and low affinity for water, i.e. low solubility or solvent power for water or the liquid phase in contact therewith.

DETAILED DESCRIPTION OF THE INVENTION

Figure 1:
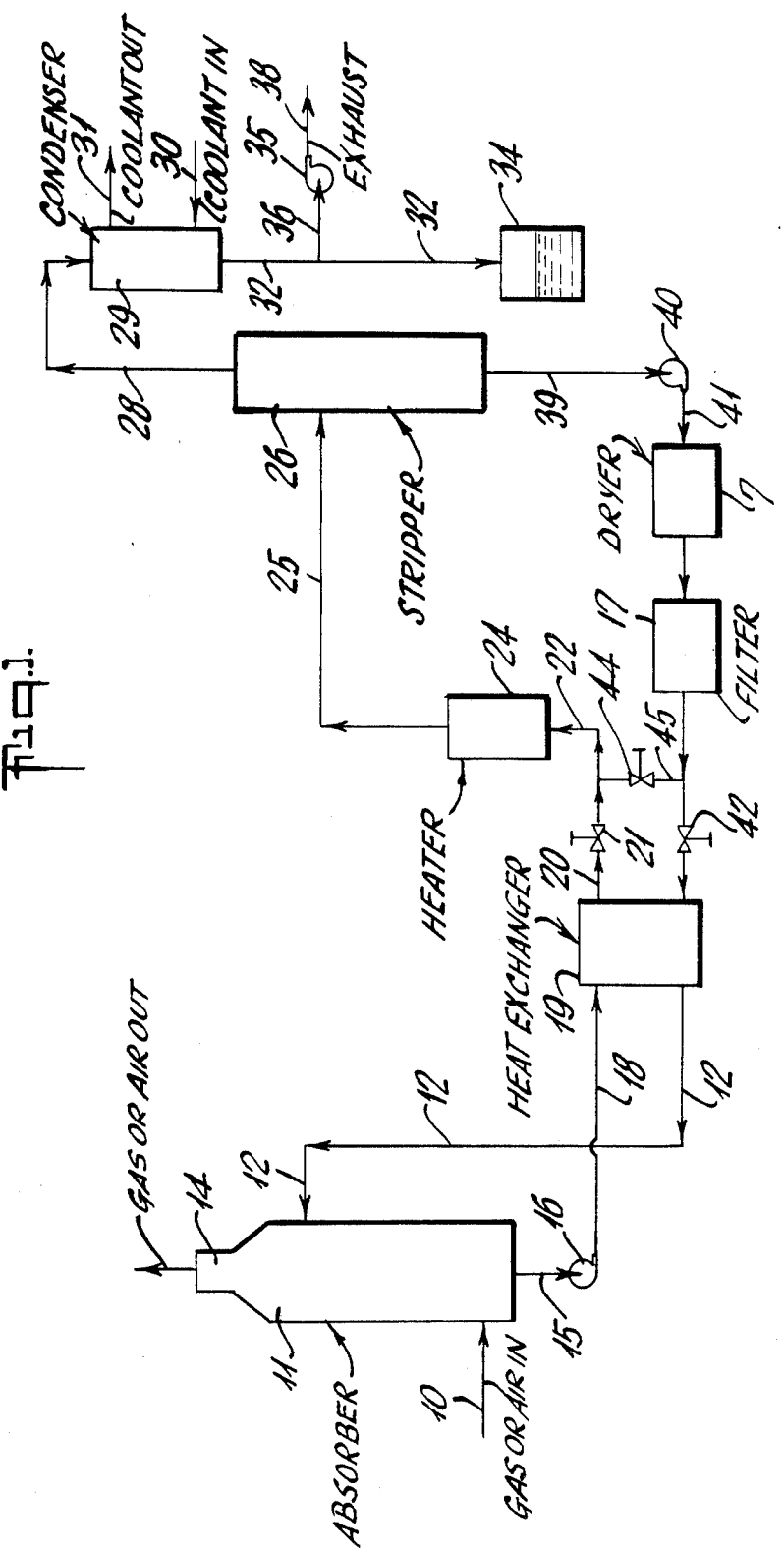

Normally compounds which are useful as plasticizers appear to be particularly effective as selective solvents in the practices of this invention since such compounds possess low vapor pressure at ambient and even at elevated temperatures up to about 400° F., have high boiling points, are thermally stable, inert and provide solvent power and selectivity for very many organic compounds.

To demonstrate the effectiveness, operability and utility of a liquid selective solvent, such as a dialkylphthalate as a selective solvent in accordance with the practices of this invention, air at a rate of 0.5 cubic feet per minute (CFM) is bubbled through two impingers with each impinger containing 200 ml of a candidate dialkylphthalate. The air or gas exiting the impinger is sampled using a Draeger hydrocarbon detector tube. After, for example, 110 pump strokes the hydrocarbon indicating layer is only a third discolored. At 110 pump strokes, the maximum concentration of dialkylphthalate (DAP) in the air stream is less than about 74 ppm. Various pressure data indicated that at ambient temperature the maximum concentration in the vapor would be about 15 ppm. These tests indicated that dialkylphthalates are acceptable as a liquid selective solvent for use in the practices of this invention. These tests indicated that the volatility of DAP is low enough to be acceptable for use as a liquid selective solvent in the practices of this invention.

In a series of tests to establish the effectiveness of a dialkylphthalate as a selective solvent in the practices of this invention, an air stream containing an organic pollutant or a volatilized organic solvent generated by sparging approximately 0.5 CFM of air through a volume of solvent is employed. The resulting organic solvent contaminated air stream is then pulled through impingers in contact with the dialkylphthalate solvent by means of a vacuum pump and monitored by a rotameter placed on the discharge of the vacuum pump. Inlet and and outlet organic contaminant or volatile solvent concentrations is measured, See Table I.

TABLE I

| Organic Contaminant | Concentration Inlet (ppm) | Concentration Outlet (ppm) | Removal Efficiency % |
|---|---|---|---|
| Acetone | 4000–5000 | <100 | 97+ |
| Benzene | 420+ | 30 | 93+ |
| Toluene | 1900 | 100 | 95 |
| m-Xylene | 398 | 27 | 93 |
| m-Xylene | 747 | 30 | 96 |
| Trichloroethylene | 100 | <10 | 90 |

Test results of Table I show that dialkylphthalate is a useful scrubbing agent or selective solvent for the various volatile organic compounds tested. Although these tests indicate the effectiveness of dialkylphthalates as liquid selective solvents in the practices of this invention, economics indicated that a scrubber or adsorption column employing the liquid selective solvent desirably should recirculate the solvent with a constant slipstream being withdrawn from the recycled solvent. This slipstream would then be heated to discharge and release any dissolved contaminant or volatile materials therein, all in accordance with the practices of this invention. With flashing or release of the dissolved contaminant or volatile materials therefrom, the resulting heated selective solvent could be cooled or recycled back to the scrubber.

Reference is now made to FIG. 1 of the drawings which illustrates one version of the practices of this invention as applied to the recovery of volatilized pollutants or other materials from a gaseous or air stream. In FIG. 1 a gas or air stream at ambient temperature, such as in the range 40°–100° F., and containing a contaminant, such as a volatile organic solvent, is introduced via line 10 into the lower portion or bottom of absorber or tray tower 11 wherein it is brought into direct countercurrent liquid-gas contact with a liquid selective solvent introduced into the other end or top portion of absorber 11 via line 12. The temperature of the selective solvent is at substantially ambient temperature in the range about 50°–110° F., more or less. After direct contact with the selective solvent introduced into scrubber 11, there issues via exit 14 from that end of the absorber 11 near the point of introduction of the selective solvent thereinto a gaseous or air stream now substantially depleted with respect to the contaminant or volatile organic solvent. From the other end or bottom of absorber 11 liquid selective solvent is withdrawn via line 15 and is moved by pump 16 and line 18 through indirect heat exchanger 19. The liquid selective solvent leaves indirect heat exchanger 19 via line 20 through control valve 21 and line 22 and then through heater 24 wherein it is heated to an elevated temperature in the range about 300°–500° F., more or less, and then passed via line 25 into desorber or stripper 26. Within stripper 26 which is maintained at a reduced pressure, such as subatmospheric pressure or a lower pressure than absorber 11, the contaminant or volatile organic material picked up by a selective solvent within absorber 11 is released or discharged or flashed and passed via line 28 to condenser 29 wherein the contaminant or the volatile organic material is condensed. Condenser 29 is supplied with coolant, such as cooling water, which enters condenser 29 via line 30 and leaves via line 31. The resulting condensed volatile material is discharged from condenser 29 via line 32 to receiver 34 for collection and eventual recovery or disposal. Stripper 26 is maintained at a lower pressure relative to absorber 11 by means of vacuum pump or vacuum jet 35 which is in fluid communication with stripper 26 via line 36. The uncondensed gases exit through vacuum pump or jet 35 via line 38.

As indicated in FIG. 1, the stripped or lean selective solvent leaves the bottom of stripper 26 via line 39, is moved by a pump 40 via line 41 through drier 7 for removal of any water, then through filter 17 for solids removal and then through control valve 42 into heat exchanger 19 for indirect heat exchange relationship with the rich selective solvent from absorber 11 entering heat exchanger 19 via line 18. Preferably Dryer 7 and Filter 17 are positioned in line 18. Within heat exchanger 19 the relatively hot lean selective solvent passes in indirect heat exchange relationship with the relatively cool rich selective solvent and is cooled while at the same time the relatively hot lean liquid selective solvent serves to heat the rich selective solvent from absorber 11 before it enters heater 24 for heating therein before entering stripper 26. The resulting, now cooled lean selective solvent leaves heat exchanger 19 via line 12 and enters the upper portion of absorber 11 to contact additional contaminant or volatile organic material in the air stream entering via line 10 the other end or bottom of absorber 11 for removal of contaminant or volatile organic material therefrom. For operational control, such as temperature and flow control and start up or rapid heat up, valve 44 is provided in line 45 to bypass the liquid selective solvent moving through lines 22 or 41. Desirably, as indicated, drier 7 for H$_2$O removal and filter 17 are provided in line 41 to clean up the selective solvent moving therethrough.

Figure 2:
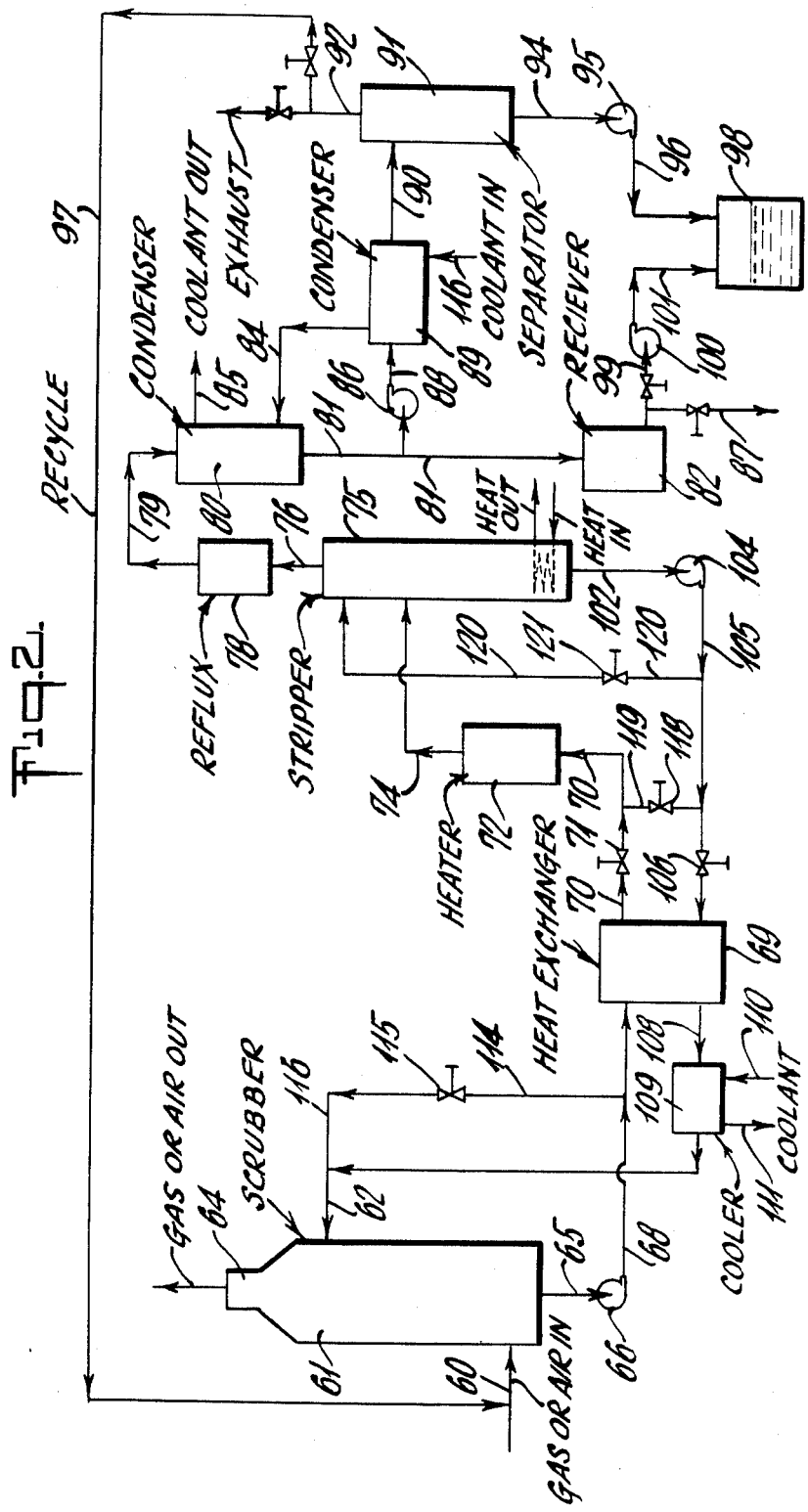

Reference is now made to FIG. 2 of the drawings which illustrates in another embodiment of the practices of this invention employing a more elaborate array of equipment and possessing greater versatility with respect to process control and ability to handle various contaminants and volatile organic materials which may be present in a gaseous or air stream to be treated. As illustrated in FIG. 2, a contaminant-containing gas or air stream, the contaminant being a volatile organic material, for example, a hydrocarbon, such as toluene, or a special volatile solvent employed in the paint, ink solvent and semi-conductor industries, such as xylene, n-butyl acetate or methylene chloride, is supplied via line 60 into scrubber or absorber 61, scrubber or absorber 61 being either a tray tower or packed tower. Scrubber 61 is operated at any suitable pressure, ambient, atmospheric, subatmospheric or superatmospheric pressure, depending upon the pressure of the gas or air stream entering scrubber 61 via line 60. Within scrubber 61 the gas or air stream supplied via line 60 comes into direct countercurrent liquid-gas contact with the liquid selective solvent supplied to the upper or other end of scrubber 61 via line 62. After contact with the liquid selective solvent within scrubber 61, the gas or air stream, now having a substantially depleted contaminant or volatile organic content, leaves the upper end of scrubber 61 via exit 64.

At the same time there is recovered from the bottom of scrubber 61 via line 65 liquid selective solvent now rich in contaminant or volatile organic compound content relative to the liquid selective solvent entering scrubber 61 via line 62. Desirably, scrubber 61 is operated substantially isothermally along its height or distance of travel or contact between the liquid selective solvent and the gas stream supplied to scrubber 61. If desired, scrubber 61 may be operated with a small temperature gradient, such as a differential of about 2°–40° F. between the ends of scrubber 61 where the treated gas exits via exit 64 and the liquid solvent exits via line 65. Usually scrubber 61 is operated at about ambient temperature in the range 40°–120° F., more or less.

The relatively rich liquid selective solvent exiting scrubber 61 via line 65 is moved by pump 66 and line 68 through heat exchanger 69 wherein it is heated and leaves via line 70 through control valve 71 into heater 72 wherein it is heated to a temperature substantially higher than the temperature at which the relatively rich liquid selective solvent exits scrubber 61 via line 65. Usually, the relative rich selective solvent leaves heater 72 via line 74 at an elevated temperature, substantially higher than the temperature at which the selective solvent left scrubber 61 via line 65, such as a temperature in the range 150°–600° F. The hot relatively rich selective solvent is then introduced via line 74 into stripper 75, stripper 75 desirably being maintained at a reduced pressure relative to the pressure maintained within scrubber 61, such as at a pressure in the range about 10–100 mm Hg absolute or such that the pressure differential relative to the pressure within scrubber 61 in the range 20–750 mm Hg, more or less, depending upon the pressure within absorber 61.

Upon entering stripper 75 the contaminant or volatile organic material contained within the rich hot liquid selective solvent flashes therefrom and leaves stripper 75 via line 76, enters condenser or reflux condenser 78 then via line 79 to condenser 80 and from condenser 80 via line 81 to receiver 82 for the collection of the condensed volatiles. As indicated, coolant, such as water, leaves condenser 80 via line 85. The uncondensed gases are removed from line 81 via vacuum pump 86 and passed via line 88 through condenser 89 for the removal of additional volatile materials which exit condenser 89 via line 90 into liquid-gas separator 91 from which the uncondensed gases are exhausted via valved line 92. The volatiles condensed within condenser 89 are passed via line 90 to separator 91 and leave separator 91 via line 94 and are moved via pump 95 and line 96 to receiver 98. Receiver 98 is also supplied with condensate recovered from condensate receiver 82 via line 99, pump 100 and line 101. Also, as illustrated in FIG. 2, the coolant or cooling water enters condenser 89 via line 118 and leaves via line 84 to enter condenser 80 from which it exits via line 85. Valved line 87 provides for the separate removal of condensation from receiver 82, if desired.

The now lean hot liquid selective solvent issues from stripper 75 via line 102 and pump 104 and is supplied via pump 104 and line 105 through control valve 106 to heat exchanger 69 wherein it passes in indirect heat exchange relationship with the rich relatively cool liquid selective solvent supplied via line 68 through heat exchanger 69. If desired, the resulting cooled lean selective solvent leaving heat exchanger 69 via line 108 may be further cooled within cooler or heat exchanger 109 which is supplied with coolant liquid via line 110 and which exits via line 111. Thereupon, the resulting cooled lean liquid selective solvent leaves cooler 109 via line 112 and is supplied via line 62 to scrubber 61 to contact additional contaminant or volatile organic compound in the entering gas or air supplied to scrubber 61 via line 60. As indicated, for control purposes, such as maintaining a temperature control within scrubber 61, a sufficient amount of rich relatively cool liquid selective solvent is removed from line 68 via line 114 through flow control valve 115 and line 116 for admixture with the cooled lean selective solvent supplied to scrubber 61 from cooler 109 via lines 112 and 62. Also for operational control line 118 with associated flow flow control valve 119 and line 120 with associated flow control valve 121 are provided for control of the liquid selective solvent entering stripper 75 and the operation of stripper 75 and for temperature control of the selective solvent leaving heater 72 via line 74 as well as controlling the temperature and other process control conditions within stripper 75. Valved line 97 is provided to recycle gases, if desired, from separator 91 to gas or air intake line 10 into absorber 11 for more complete recovery of any remaining recoverable volatile material or pollutant not vented from separator 91 via line 92. Stripper 75 is provided with reboiler or heater 77 for better or optional operational control and, also for operational control, line 99 from receiver 82 is provided with valved line 87 in communication with valved line 99.

Further illustrative of the practices of this invention, the following example is presented:

EXAMPLE

A toluene-contaminated air stream at or near ambient temperature, in the range about 40°–100° F. and containing approximately 10–10,000 ppm toluene is introduced into an absorber, such as a packed column but preferably a tray type scrubber, and is contacted therein, also at about ambient temperature, in the range about 50°–120° F., with a selective solvent for toluene.

The gas-liquid contacting is carried out in the absorber under conditions so as to effect at least about 90% removal of the toluene from the air stream containing the absorber.

The selective solvent, now containing toluene dissolved therein, is withdrawn from the bottom of the absorber and heated to an elevated temperature in the range about 325°–500° F., such as 400° F. The heating of the toluene-rich selective solvent is desirably carried out in a heat exchanger employing steam as the heating fluid but, if desired, an electrical heater in place of or supplemental to the steam-supplied heat exchanger might be employed.

The resulting heated toluene-containing selective solvent is then introduced into the stripper or regeneration section of the overall apparatus or system. The stripper or regeneration section comprises a single stage flash evaporating unit or a multi-stage distillation column, operated with or without reflux. To aid in the removal of the solvent from the selective solvent, the stripper is operated under subatmospheric pressure, such as a pressure in the range 20–100 mm Hg, absolute, e.g. about 50 mm Hg absolute. The resulting toluene vapors released from the stripper are introduced into a condenser or condensing unit where the toluene vapors are condensed and collected in a receiving tank. At the same time the resulting hot solvent now substantially free of or having a reduced toluene content is removed from the bottom of the stripper and then cooled to about ambient temperature and returned to the absorber to contact additional toluene-containing air stream.

In order for the overall operation to be economical, i.e. to reduce the overall energy requirements, the heat required for the operation of the stripper, i.e. the heat employed to heat the selective solvent to release the toluene therefrom, should be recovered as much as possible. This is accomplished by heating the ambient temperature toluene-rich selective solvent stream removed from the bottom of the absorber by indirect heat exchange relationship with the hot, lean selective solvent withdrawn from the stripper. Additional cooling of the lean, stripped selective solvent, if required, can be accomplished by means of a heat exchanger employing water as coolant, and additional heating of the toluene rich selective solvent withdrawn from the absorber can be accomplished by passing the solvent from the absorber through a heat exchanger employing steam as the heating fluid or by other means for heating the solvent. Accordingly, one, two or three separate heat exchangers may be required and multi-stage heat exchangers may also be employed in the practices of this invention. The amount of additional heating or cooling required depends on the volume of the selective solvent moving within the system from the absorber to the stripper and back to the absorber, as well as temperatures of the selective solvent streams entering or leaving the various heat exchangers.

Although emphasis of the disclosures of the practices of this invention has been given to the recovery of pollutants or other materials from a gaseous or air stream, as illustrated in FIGS. 1 and 2, it is disclosed herein that the practices of this invention are also applicable to the recovery of pollutants or other materials from a liquid stream, such as an aqueous or non-aqueous liquid stream, containing pollutants or other materials dissolved and/or suspended therein. When a liquid stream is treated in accordance with the practices of this invention, the liquid selective solvent employed would be substantially insoluble in or immiscible with respect to the liquid, aqueous or non-aqueous, stream being treated. The liquid selective solvent employed would also exhibit affinity or selectivity for the pollutant or other material dissolved or contained in the liquid stream being processed. In a special embodiment of the practices of this invention the liquid selective solvent could contain therein a reactant which would be capable of reacting with the pollutant or other material contained in the stream being processed so that the resulting reaction product would be more readily soluble and/or fixed in the liquid selective solvent, thereby substantially effecting complete removal of the pollutant or other matlerial from the liquid stream being treated.

In the application of the practices of this invention involving the treatment of a liquid stream with a liquid selective solvent the contact between the liquid stream and the liquid selective solvent, as indicated hereinabove, could be carried out in a continuous countercurrent operation or a continuous co-current operation. In the case of co-current treatment a separator would be provided to separate the liquid stream being treated from the immiscible liquid selective solvent phase. In addition to countercurrent and co-current contacting, the treatment of a liquid stream with a liquid selective solvent can be effected batchwise with both the liquid stream to be treated and the liquid selective solvent being introduced into a mixer for intimate mixing therein and then, after mixing, the immiscible liquid phase is permitted to settle and separate with the recovery of the liquid selective solvent phase containing the pollutants or other material dissolved therein and the separate recovery of the liquid stream now having been treated for the removal of pollutant or other material therefrom.

As will be apparent to those skilled in the art in the light of the foregoing disclosure, many substitutions, alterations and modifications are possible in the practices of this invention without departing from the spirit or scope thereof.

What is claimed is:

1. A method of removing a gaseous or vaporized pollutant from a gaseous stream at substantially atmospheric pressure containing the same which comprises passing said stream containing said pollutant into contact with a dialkylphthalate selective solvent or absorbent for said pollutant, removing the resulting treated stream now having a reduced amount of said pollutant therein and recovering said selective solvent now having said pollutant contained therein, heating the resulting recovered said selective solvent to an elevated temperature, said elevated temperature being higher than the temperature at which said selective solvent was brought into contact with said stream, so as to release said pollutant from said selective solvent, recovering the resulting released pollutant, recovering the resulting heated liquid selective solvent now having a reduced amount of pollutant therein, cooling the resulting treated heated selective solvent and introducing the resulting cooled selective solvent into contact with an additional pollutant-containing stream for the removal of pollutant therefrom, the contacting operation between said selective solvent and said pollutant-containing gaseous stream and the release of the pollutant from the resulting heated selective solvent being carried out such that the pressure during which said selective solvent contacts said pollutant-containing stream is higher than the pressure during which said pollutant is released from said heated selective solvent.

2. A method in accordance with claim 1 wherein said gaseous stream is an air stream.

3. Apparatus useful for removing a gaseous or vaporized pollutant from a gaseous stream containing the same comprising a gas liquid tray tower contact zone, said contact zone being provided with a gas exit outlet at one end thereof and a gas inlet at the other end thereof, said contact zone also being provided with a liquid selective solvent inlet at one end thereof and a selective solvent liquid outlet at the other end thereof, means for supplying a liquid selective solvent to said selective solvent inlet and means for recovering liquid selective solvent from the other end of said contact zone, conduit means transferring selective solvent recovered from said other end of said contact zone through an indirect heat exchange zone and then a heating zone, conduit means for supplying liquid selective solvent from said heating zone into a stripping zone, heating means provided within said stripping zone, gas exit means from one end of said stripping zone for the recovery of gaseous or volatilized pollutant therefrom and outlet means at the other end of said stripper for the recovery of liquid selective solvent therefrom, conduit means for supplying liquid selective solvent recovered from said stripping zone to said indirect heat exchange zone for indirect heat exchange contact with said selective solvent supplied from said contact zone to said indirect heat exchange zone and then to said heating zone, conduit means for supplying liquid selective solvent from said indirect heat exchange zone to the selective solvent inlet of said contact zone.

* * * * *